Figure 1:
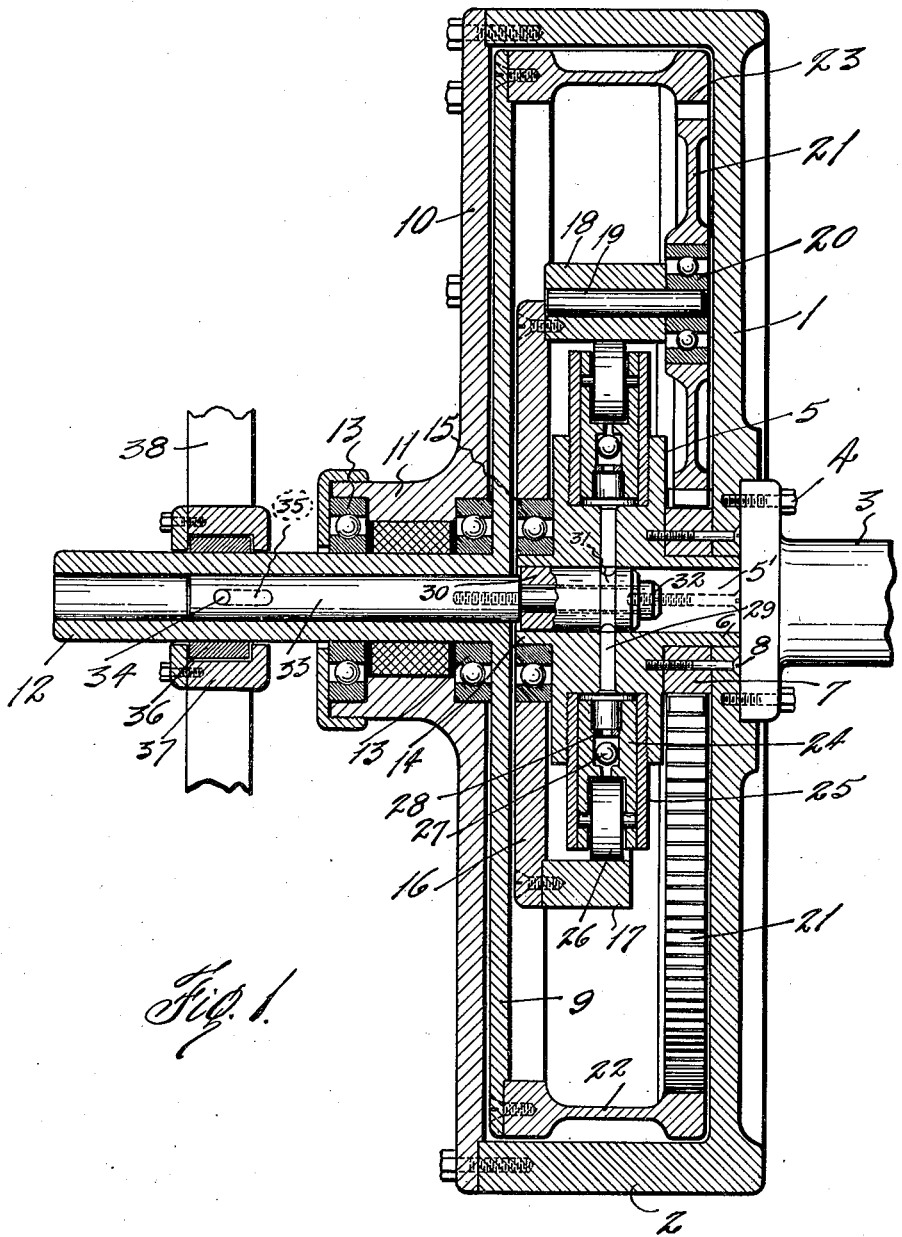

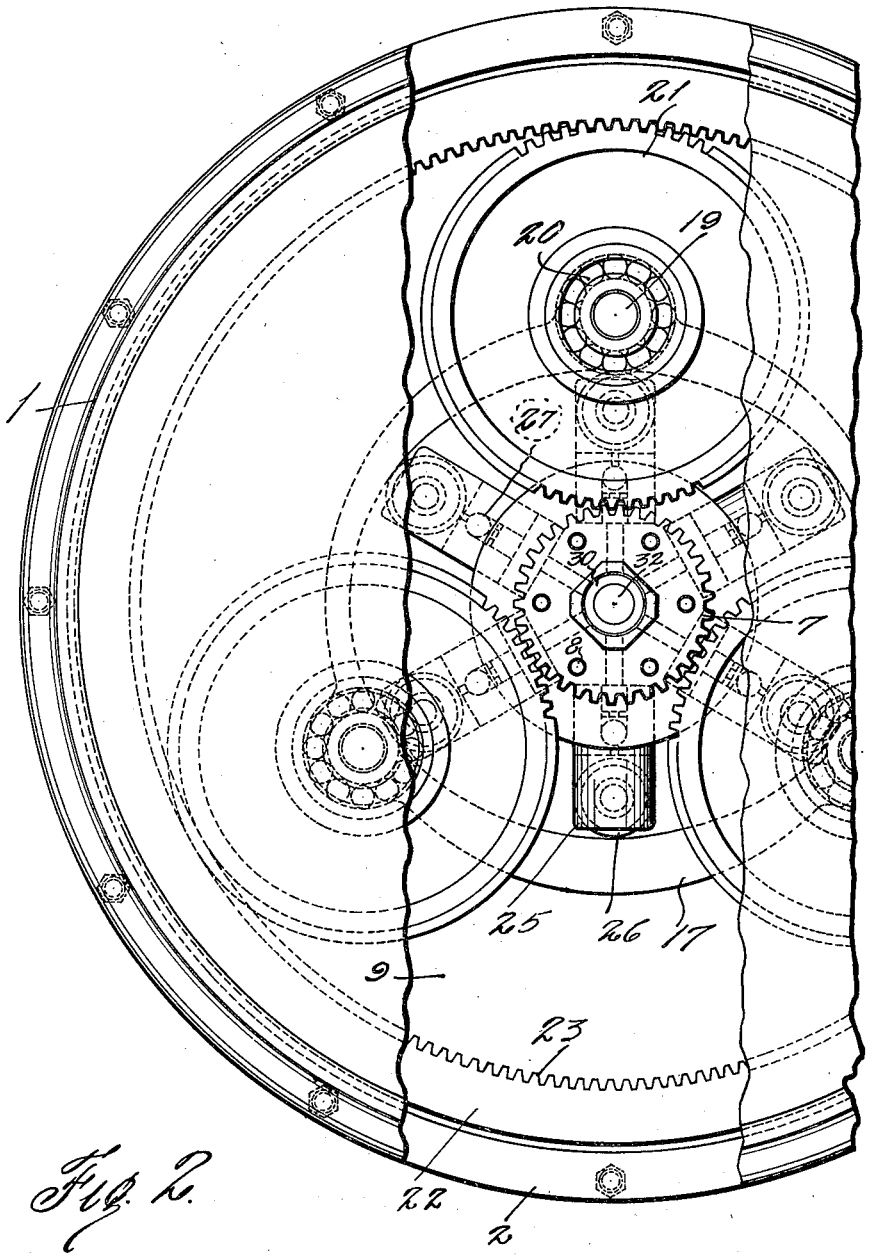

UNITED STATES PATENT OFFICE.

ADRA M. HUBBARD, OF DALLAS, TEXAS.

CLUTCH AND TRANSMISSION DEVICE.

1,369,244.

Specification of Letters Patent.

Patented Feb. 22, 1921.

Application filed May 21, 1919. Serial No. 298,588.

*To all whom it may concern:*

Be it known that I, ADRA M. HUBBARD, a citizen of the United States, residing at Dallas, in the county of Dallas and State of Texas, have invented certain new and useful Improvements in Clutch and Transmission Devices, of which the following is a specification.

This invention has particularly to do with fluid clutches and transmissions.

In the transmission devices of the selective gear type, now commonly used in motor vehicles, the delivery of power or rotation from the motor to the driving gear is had only by fixed gear ratios and no variations in proportion to the load are possible. A large majority of automobiles are equipped with transmissions having "low", "intermediate" and "high" gear selections or ratios. It is well known that a gasolene engine develops its maximum horse power at its highest speed, but a dead load cannot be picked up at high speed by applying the power direct to the load; therefore the load must be picked up gradually through two or more gear reductions. Consequently the maximum power cannot be applied and is not available for heavy duty.

The purpose of this invention is to provide means for delivering the greatest power in proportion to the load and making it possible to pick up a load at maximum horse power without overloading the engine; and to do so without the use of selective gears.

Some development has been had along this line of endeavor as for instance the clutch device covered by the Letters Patent issued to Oscar M. Hubbard and myself on May 29, 1917, No. 1,227,910. However there are certain objections to the patented device and I have sought to improve said device and add thereto.

In carrying out the invention I provide a combined cylindrical casing and fly-wheel which is connected direct to the motor crank shaft. Within the casing is mounted a head and a driving pinion fixed to and revolving with the casing. A large gear-ring member is mounted in the casing and connected with the driving shaft. An elliptical clutch ring is free within the casing and carries gears meshing with the gear ring and of larger diameter than the driving pinion. By locking the head and clutch ring together the outer gear ring is driven direct by the gears which are also locked against rotation, but by establishing a "slipping" connection between the clutch head and the clutch ring a gear ratio is set up between the pinion and the outer gear ring through the transmission gears therebetween. It is obvious that the ratio will vary in proportion to the relative rotation of the clutch head and the clutch ring; also that the maximum horse power of the motor is delivered to the clutch head and said horse power may be applied in proportion to the load to an exact degree. By means of fluid held plungers connection is had between the clutch head and the clutch ring and by controlling the displacement of the fluid the relative movement of the head and clutch ring are controlled. Certain other advantages will be hereinafter pointed out.

The invention will be more readily understood from a reading of the following specification and by reference to the accompanying drawings, in which an example of the invention is shown and wherein:

Figure 1 is a diametrical sectional view of a device constructed in accordance with this invention, and Fig. 2 is a front view of a portion of the device, a portion of the casing being omitted.

In the drawings the numeral 1 designates a cylindrical casing having a thickened rim 2 giving it sufficient weight to serve as a fly wheel. As its center the casing is fastened to the motor shaft 3 by means of bolts 4. A clutch head 5 is concentrically mounted in the casing and has a forwardly extending integral sleeve 6 entering the front of the casing and bearing against the end of the shaft 3. Sufficient space is provided between the head and the front of the casing to snugly receive a driving pinion 7 fitting on the sleeve 6. Screws 8 passing through the front of the casing and the pinion are threaded into the head. The shaft, casing, pinion and clutch head being fastened together revolve in unison, thus the maximum power is delivered to the pinion and head.

A disk 9 is concentrically disposed in the casing at the rear and in juxtaposition to a cover plate 10 closing the rear side of the casing. The disk has an integral hollow drive shaft 12 extending rearwardly through a bearing boss 11 provided on the outside of the plate 10. Ball bearings 13 are interposed between the boss 11 and shaft 12. The head 5 has a central cylindrical bore 5' extending from the sleeve 6 to a collar 14 on its rear side. A ball-bearing ring 15 surrounds the collar and carries an elliptical clutch plate 16 on which an elliptical clutch ring 17 is fastened. The clutch plate and ring are free from both the drive shaft and its disk and clutch head and the casing—it might be termed as "floating."

Enlargements 18 are provided in the ring at equidistant points circumferentially of the casing and have fixed therein pins 19 on the projecting ends of which ball-bearing rings 20 are suitably fastened in juxtaposition to the front wall of the casing. Spur gears 21 are mounted on the rings 20 and these gears mesh with the pinion 7; said gears being considerably larger in diameter than the pinion. An annular flange 22 is fastened to the margin of the disk 9 and has an external diameter slightly less than the internal diameter of the casing. The flange has an internal gear ring 23 in mesh with the gears 21. It will be seen that as long as the clutch ring is free the gears will float around the gear ring, being driven by the pinion. The driven shaft being connected with the running gear of the vehicle and sustaining the load will hold the disk 9 and flange 22 against revolution and thus the gears will merely travel around the gear ring.

It will be apparent that by establishing connection between the clutch head and the clutch ring the latter will be locked against independent revolution and must revolve with the head and the casing at the same speed. The gears are thus locked against rotation by the pinion 7 and consequently lock in the gear ring, thereby imparting revolution to the gear ring and the disk 9 and driven shaft 12, which latter will be revolved at the same speed as the motor shaft 3. By allowing a certain amount of lost motion or "slippage" between the clutch head and elliptical ring 17 the pinion 7 will revolve the gears which in turn will revolve the gear ring and thus effect a reduction whereby the load on the driven shaft may be picked up.

For establishing connection between the head and clutch ring I employ radial plungers 24 mounted to slide in tubular housings 25 carried by the head. Each plunger has a socket in its outer end receiving a roller 26 bearing against the inner wall of the ring 17. Each plunger has a ball valve 27 seating therein and cutting off the passage of fluid to the socket of the roller. The casing is about half filled with oil. The ball valves are confined by washers 28. Radial ports 29 extend from the bore 5' of the head to the housings and communicate with the bores of the plungers.

A cylindrical valve 30 is slidable in the bore 5' and has a circumferential groove 31 adapted to register with the ports 29 and establish communication therebetween. The valve 30 is loosely confined on a headed pin 32 which has its rear end reduced and screw-threaded into the end of a valve stem 33 fitting snugly in the bore of the driven shaft 12. By loosely mounting the valve 30 the head and drive shaft may undergo slight relative lateral displacement without binding either the valve or its stem. Oil working past the valve 30 will escape between the end of the valve and disk 9 and not being under pressure at this point will not tend to work along the stem.

The stem has a transverse pin 34 at its rear end engaging in a slot 35 in the driven shaft. When the pin is at the rear end of the slot the groove 31 is in registration with the ports 29. A collar 36 slidable on the shaft receives the pin. The collar is confined in a flanged ring 37 in which it rotates. The flanged ring is pivoted to a lever 38, which latter may be attached to a clutch pedal or other operating medium (not shown).

By observing Fig. 2 it will be seen that as the head revolves the plungers will be forced inward as their rollers 26 travel from the longest dimension to the shortest dimension of the ellipse formed by the inner wall of the clutch ring 17. If the groove 31 is in registration with the ports 29 when the plungers are forced inward the oil behind the plungers is displaced through the ports 29 to the bores of the other plungers, thereby seating the ball valves 27 of the said other plungers and preventing the escape of the oil; however the plunger rollers do not lock against the clutch ring and no connection is established with the head.

Should the valve 30 be moved forward to nearly close the ports 29 then the oil would not be displaced fast enough to permit the plungers moving inward to travel with sufficient rapidity to avoid a driving contact with the clutch ring. Such an action would impart revolution to the clutch ring, but at a slower speed than the speed of the head. By controlling the displacement or flow of the oil the clutching action between the parts is controlled. This action is what is termed slipping the clutch and the load may be gradually picked up without reducing the speed of the motor. If the valve 30 is moved forward sufficiently to close the ports then the oil behind the inwardly moving plungers is compressed and the plunger rollers prevented from passing the narrow portion of the clutch ring. This locks the gears and applies the power direct. When the clutch is being slipped the gears 21 are being revolved and a gear reduction is had, which may be regulated to a minute degree by manipulating the valve 30.

What I claim, is:

1. In a fluid pressure clutch and transmission device, a revolving casing, a clutch head fixed to the casing, a pinion fixed to the casing, a gear member in the casing, a floating clutch ring in the casing, gears carried by the clutch ring between the pinion and the gear member and meshing with both, fluid operated means for establishing connection between the head and the clutch ring, means for controlling the fluid operated means for varying the clutching connection between the head and the clutch ring, and a driven shaft connected with the gear member.

2. In a fluid pressure clutch and transmission device, a revolving casing, a clutch head arranged within the casing and connected therewith to be driven thereby, a pinion arranged near the clutch head and connected with the casing to be driven thereby, a gear member in the casing and rotatable with relation to the same, a floating clutch ring arranged within the casing and rotatable with relation thereto, gears carried by the clutch ring and engaging the pinion and the gear member, adjustable fluid operating means for establishing connection between the clutch head and the clutch ring, and a driven shaft connected with the gear member.

3. In a fluid pressure clutch and transmission device, a revolving casing constituting a driving member, a pinion arranged within the casing and connected therewith to be driven thereby, a gear member arranged in the casing and rotatable with relation thereto, a driven shaft connected with the gear member, a supporting member arranged within the gear member and rotatable with relation to the casing, gears rotatably mounted upon the supporting member and engaging the pinion and the gear member, and adjustable fluid operated means for establishing connection between the supporting member and the casing.

4. In a fluid pressure clutch and transmission device, a revolving driving member, a revolving driven member, a gear member connected with the driven member and rotatable with relation to the driving member, a floating clutch ring arranged near the gear member, a pinion connected with the driving member, gears engaging the pinion and gear member and connected with the floating clutch ring, and adjustable fluid operated means for establishing frictional connection between the floating clutch ring and the driving member.

5. In a fluid pressure clutch and transmission device, a rotatable clutch head having an axial opening and radial ports extending into such opening, tubular housings carried by the clutch head and extending substantially radially and communicating with said ports, plungers mounted to slide within the tubular housings and provided with contact elements near their outer ends, a pinion connected with the clutch head to rotate therewith, a rotatable driven element carrying a gear, a floating clutch ring member, gears connected with and supported by the floating clutch ring member and engaging the pinion and first named gear, and a valve mounted within said axial opening to be shifted longitudinally therein and provided with an exterior recess for movement into and out of registration with said ports.

6. In a fluid pressure clutch and transmission device, a revolving driving member, a revolving driven member, a pinion connected with the driving member for rotation therewith, a gear member connected with the driven member for rotation therewith, a floating clutch ring, gears connected with the clutch ring and engaging the pinion and gear member, and adjustable fluid pressure operated means for effecting a frictional connection between the clutch ring and one revolving member, including a clutch head secured to such revolving member.

7. In a fluid pressure clutch and transmission device, a rotatable clutch head having an axial opening and radial ports extending into such opening, tubular housings carried by the clutch head and extending substantially radially and communicating with said ports, plungers mounted to slide within the tubular housings and carrying contact elements near their outer ends, said plungers being provided with openings, valves arranged within the plungers and adapted to cover said openings thereof, a pinion connected with the clutch head to rotate therewith, a rotatable driven element carrying a gear, a floating clutch ring member arranged to be engaged by the contact elements, gears connected with and supported by the floating clutch ring member and engaging the pinion and first named gear, a valve mounted to slide longitudinally within said axial opening and provided upon its periphery with a groove for movement into and out of registration with said radial ports, and a substantially closed casing containing all of said elements.

In testimony whereof I affix my signature.

ADRA M. HUBBARD.